United States Patent
Gale

[11] 4,230,208
[45] Oct. 28, 1980

[54] MOISTURE REMOVAL ASSEMBLY

[76] Inventor: John T. Gale, 3785 44th Ave., North, St. Petersburg, Fla. 33714

[21] Appl. No.: 54,858

[22] Filed: Jul. 5, 1979

[51] Int. Cl.³ .............................................. F16D 69/00
[52] U.S. Cl. .................................... 188/73.1; 188/24; 188/71.1; 188/250 B
[58] Field of Search .................... 188/24, 73.1, 250 B, 188/71.1, 73.5, 218 A, 250 B, 250 E, 250 G

[56] References Cited
U.S. PATENT DOCUMENTS
4,029,181  6/1977  Lewis ................................. 188/24 X FOREIGN PATENT DOCUMENTS
499508  3/1951  Belgium .................................... 188/24
2653607  6/1978  Fed. Rep. of Germany .......... 188/71.1

Primary Examiner—Douglas C. Butler
Attorney, Agent, or Firm—Arthur W. Fisher, III

[57] ABSTRACT

A moisture removal assembly designed to be mounted on a brake shoe and pad structure of the rim engaging or caliper type brake assembly comprising a base designed to be removably attached to the brake shoe and a wiper blade structure depending from the base in spaced apart relation from the leading edge of the brake shoe and pad and further being disposed in sliding, wiping engagement with the surface of the rim engaged by the brake pad so as to remove moisture therefrom prior to braking engagement between the wheel rim and brake pad.

7 Claims, 3 Drawing Figures

U.S. Patent  Oct. 28, 1980  4,230,208
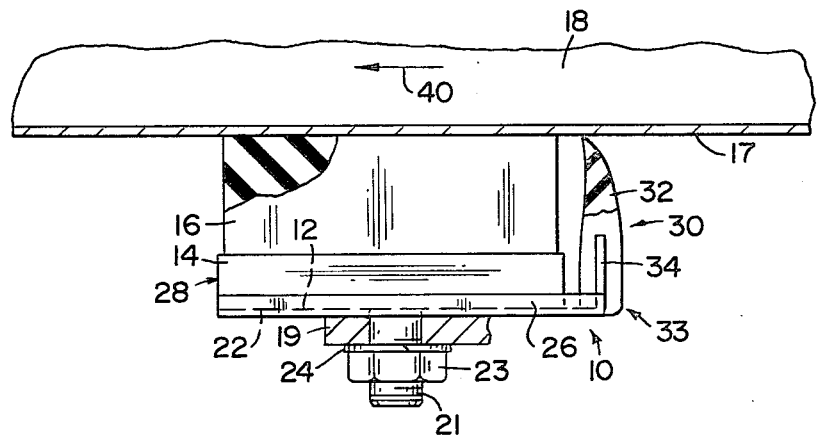
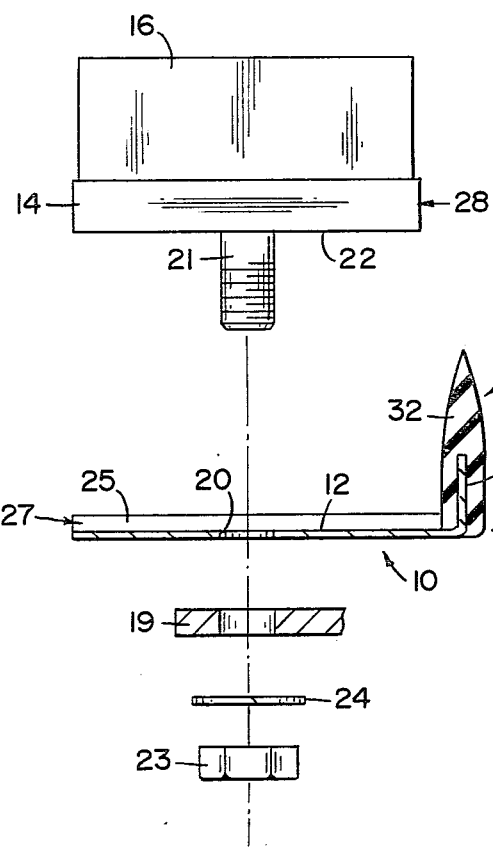
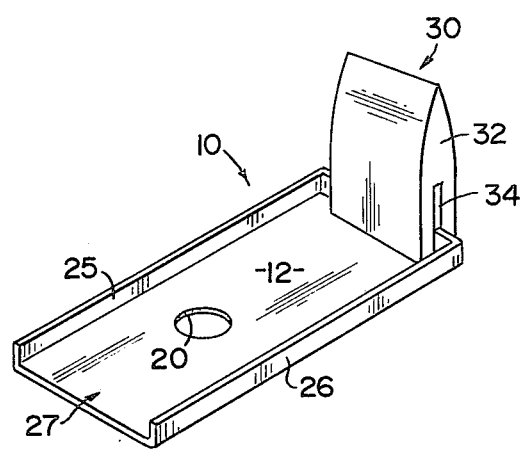

MOISTURE REMOVAL ASSEMBLY

BACKGROUND OF THE INVENTION

1. Field of the Invention

This invention relates to a wiper blade structure designed to be removably secured into and out of wiping engagement with the surface of the rim of the wheel so as to remove water or moisture therefrom immediately prior to braking engagement between a brake pad and the subject rim surface.

2. Description of the Prior Art

Brake shoe and pad assemblies of the type designed to clamp or grip the rim of a bicycle wheel are quite well known in the industry. These brake assemblies are generally referred to as a caliper type brake assembly wherein brake shoes and associated pads grip opposite surfaces of the wheel rim simultaneously through a closing or clamping action by the caliper assembly.

One problem associated with the use of such a braking arrangement is the collection or gathering of water or moisture on the rim surface when the bicycle or like vehicle is ridden in raining weather or when the wheel or rim passes through puddles of collected water or moisture. Even though certain centrifugal force is created by the constant rotation of the wheel and rim, water still has a tendency to collect on the exterior surface of the rim. Accordingly, when the brake pad is applied to such moisture ladden surface extreme slippage normally occurs thereby defeating the desired braking action when the caliper type brake assembly is activated.

Accordingly, the recognized problem in the bicycle industry is means to remove the water from the rim prior to or at least concurrently with engagement of the brake pad with the rim surface. Such attempts to correct this problem existing in the prior art include various configurations of the brake pad and/or shoe assembly itself. The U.S. Pat. Nos. to Lewis, 4,029,181; Hamayasu, 3,840,093; Ohtani, 3,835,963; Hata, 3,732,951 and Ohtani, 3,807,533 are all examples of prior art structures specifically directed to the removal or elimination of water from the rim surface to provide adequate braking action through reasonable frictional engagement between the pad and the rim surface.

The patent to Hata shows a modification of the surface of the rim in a corrugated or detented fashion so as to allow water drainage therefrom. Also the patent to Hamayasu discloses a scraping type action wherein an outward projection are formed on the brake shoe so as to help direct water away from the actual friction producing surface of the brake pad.

While the structures above may aid in a reduction of the problem, the problem of excess moisture remaining on the surface of the rim still remains and the industry generally still considers such collection of moisture a major problem in the effective use of caliper type brake systems under all harsh or foul weather conditions.

Accordingly, there is a need in the industry for adequate structure to overcome the subject problem and effectively remove the moisture so as to allow adequate frictional engagement between the brake pad and the surface of the rim being clamped.

SUMMARY OF THE INVENTION

The subject invention is directed towards a moisture removal assembly including a wiper blade wherein the entire assembly is designed to be removably mounted on a brake shoe and pad assembly. More specifically conventional brake assemblies known as caliper assemblies are well recognized in the bicycle industry. Ths subject moisture removal assembly comprises a base means preferably having a somewhat elongated configuration designed to be removably attached to the exposed surface of a brake shoe.

Stabilizing means including at least two stabilizing elements depending outwardly from the base means on opposite sides thereof into overlapping relation with correspondingly positioned and oppositely disposed sides of the brake shoe. These stabilizing members are disposed and dimensioned to substantially limit or prevent relative rotational movement between the base means and the brake shoe when the wiper blade means as well as the brake pad of the brake assembly are concurrently applied to the peripheral surface of the rim of the wheel on a bicycle or like vehicle.

The wiper blade means comprises an elongated blade element attached to one end of the base means and extending or projecting outwardly therefrom into engagement with the braking surface of the rim of the wheel associated with a given brake assembly.

The wiping blade element itself is formed from a relatively flexible material such as rubber or the like having sufficient resiliency or flexibility to provide a "squeegee" action on the engaged surface of the rim so as to remove all excess water therefrom. The disposition of the blade element is such as to be spaced apart a predetermined distance from the leading end or edge of the brake pad and associated brake shoe when the wheel is rotating in a predetermined direction such as a forward direction. This spaced apart distance between the wiping blade element and the brake pad insured maximum removal of the water from the rim prior to the surface of the rim engaging the actual braking surface of the brake pad. The transverse dimension of the blade is such as to "wipe" at least the portion of the rim surface being engaged by the braking pad. Accordingly, transverse dimension of the wiping blade element is generally equal to or somewhat greater than the width or transverse dimension of the braking pad itself.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 is the moisture removal assembly of the present invention mounted on the supporting brake shoe and pad and in specific wiping engagement with the rim of the vehicle wheel.

FIG. 2 is a top view in exploded format of the assembly.

FIG. 3 is a perspective view of the assembly.

Similar reference characters refer to similar parts throughout the several views of the drawings.

DETAILED DESCRIPTION OF THE PREFERRED EMBODIMENT

As best shown in FIGS. 1 through 5 the moisture removal assembly of the present invention is generally indicated as 10 and includes a base means 12 having a substantially elongated configuration substantially equivalent to the overall configuration of a conventional brake shoe 14. As is normal in the art the brake shoe serves to supportingly engage a brake pad 16 which in turn is disposable by conventional caliper brake assembly into frictional, clamping engagement with a braking surface 17 (FIG. 3) of the rim 18.

The base means 12 includes a fastening means formed therein in the form of aperture 20 dimensioned and configured to be disposed in surrounding engagement with connecting shaft 21 attached to the brake shoe 14 in the normal fashion. Accordingly, the base means 12 is affixed to the exposed surface 22 of the brake shoe 14 in such a manner as to be easily removed therefrom but be maintained in supported relation thereon once disposed into operative engagement. The fastening means further comprises an attachment nut 23 and washer element 24.

The assembly of the present invention further comprises a stabilizing means comprising at least two stabilizing elements 25 and 26 extending outwardly from the base 12 into substantially overlapping relation to correspondingly oppositely disposed sides or portions of the brake shoe (FIGS. 1 and 3). More specifically the stabilizing elements 25 and 26 are configured to include depending flange elements integrally attached to the oppositely disposed longitudinal edges of the base 12 and extends substantially along the length thereof.

The base means 12 and the stabilizing elements 25 and 26 are commonly configured to define an assembly casing which, again as best shown in FIGS. 1 and 3, is designed to substantially fit over the exposed surface 22 of the brake shoe in surrounding relation to the connecting shaft 21 of the brake shoe. The assembly casing has an open end generally represented as 27 specifically so configured to allow extension outwardly therefrom of the correspondingly positioned end 28 of the brake shoe. This opened end configuration is allowed for brake shoes of varying sizes. A blade wiper means generally indicated as 30 is attached to the opposite end of the base means 12 and serves to close the opposite end of the assembly casing relative to the open end thereof 27. The wiper blade assembly 30 comprises a blade element 32 affixed as at 33 to the one end of the base means 10 by a dominently projecting connecting tongue element 34 or the like.

An important structural feature of the present invention is the formation of the wiping blade element 32 from a flexible material having sufficient flexibility and/or resiliency to act as a "squeegee" element thereby serving to wipe all or the major portion of the moisture or water from the rim surface 17 of rim 18 prior to the same surface 17 coming into contact with the brake pad 16 (See FIG. 3).

Also with regard to FIG. 3 it is important to note that the blade element 32 is disposed into frictional engagement with the surface 17 somewhat prior to the contact of the pad 16 with surface 17 such that all water may be removed therefrom prior to such frictional engagement. As indicated by directional arrow 40 the wiping blade 32 removes the moisture from the surface 17 immediately prior to such surface coming into engagement with the brake pad 16 when the wheel on which the rim 18 is mounted moves in a predetermined direction of rotation. It will be assumed that such wiping takes place when the bicycle is rolling forward and the blade thereby is in the position shown in FIG. 3.

It should be further noted that the specific brake shoe, brake pad and brake assembly as shown and referred to in the subject invention is not per se a part of the present invention. More specifically the moisture removal assembly 10 of the present invention can be adapted to fit numerous varieties, brands or types of brake shoes. However, in each case the assembly casing or the base and stabilizing means of the moisture removal assembly is specifically configured to be attached in supporting relation to the shoe 14 and moved therewith such that both the blade 32 and the brake pad 16 move into engagement with the rim at spaced apart portions from one another substantially concurrently.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A moisture removal assembly of the type primarily designed to be mounted adjacent a wheel rim engaging brake shoe and pad, said assembly comprising: base means, dimensioned and configured for mounting engagement with the brake shoe, wiper blade means attached to said base means and extending outwardly therefrom into sliding engagement with the wheel rim, a stabilizing means secured to said base means and disposed to extend outwardly therefrom into at least partial overhanging relation to the brake shoe, whereby relative rotation between the brake shoe and said base means is limited through disposition of said stabilizing means, stabilizing means comprises at least two stabilizing elements projecting outwardly from opposite side portions of said base means in overlapping relation to opposite side portions of the brake shoe, said blade means formed from a substantially flexible material and disposed in spaced apart relation from the brake shoe and pad so as to engage the wheel rim prior to the pad when the wheel rim rotates in a predetermined direction, whereby moisture is removed from the wheel rim prior to engagement with the brake pad so as to avoid slippage therebetween.

2. A moisture removal assembly as in claim 1 further comprising an attachment means formed on said base means and disposed for engagement with the brake shoe, said base means being supportingly mounted thereon for movement therewith, whereby said wiper blade means and the brake shoe and pad move substantially concurrently into engagement with the wheel rim.

3. A moisture removal assembly as in claim 2 wherein said attachment means comprises aperture means formed in said base means and configured and dimensioned for removal mounting on the base means, whereby said moisture removal assembly is replaceable after wear upon removal of the brake shoe and pad.

4. A moisture removal assembly as in claim 10 wherein each of said stabilizing elements comprises a substantially elongated, depending flange member integrally connected to and extending along opposite longitudinal edges of said base means.

5. A moisture removal assembly as in claim 10 wherein said base means and said stabilizing means are configured to define an assembly casing, said assembly casing configured and dimensioned for mounting in substantially overlapping, supported relation to an exposed surface of the brake shoe.

6. A moisture removal assembly as in claim 5 wherein said assembly casing comprises one end having an open configuration whereby the brake shoe may extend outwardly from said open end of said assembly casing.

7. A moisture removal assembly as in claim 6 wherein said wiper blade means is mounted at one end of said casing assembly oppositely disposed to said open end thereof and in spaced apart relation to said base means and the brake shoe on which said moisture removal assembly is mounted.

* * * * *